United States Patent [19]

Mabry

[11] Patent Number: 4,481,617
[45] Date of Patent: Nov. 6, 1984

[54] MEMORY DISC DRIVE

[75] Inventor: C. Thomas Mabry, San Jose, Calif.

[73] Assignee: Xerox Corporation, Stamford, Conn.

[21] Appl. No.: 420,983

[22] Filed: Sep. 21, 1982

[51] Int. Cl.³ .......................... G11B 17/04; G11B 3/00
[52] U.S. Cl. ..................................... 369/77.2; 312/10;
                                    360/133; 369/75.1; 369/262
[58] Field of Search ....................... 369/77.2, 219, 220,
                369/221, 262, 264, 75.1; 360/97, 99, 133;
                                        206/444, 387; 312/8, 9, 10

[56] References Cited

U.S. PATENT DOCUMENTS

| | | | |
|---|---|---|---|
| 3,662,360 | 5/1972 | Lambert | 369/77.2 |
| 4,084,200 | 4/1978 | Adair et al. | 360/133 |
| 4,352,174 | 9/1982 | Tajima et al. | 369/77.2 |

FOREIGN PATENT DOCUMENTS 62421  5/1977  Japan .................................. 360/133

Primary Examiner—Steven L. Stephan
Attorney, Agent, or Firm—Leonard Zalman

[57] ABSTRACT

An optical disc drive system in which the empty sleeve component of an optical disc cartridge is utilized to lock the optical disc in its operational position while occupying a storage location within the drive system. The locking/storage feature is achieved by providing adjacent to the conventional disc insertion opening in the drive frame an additional opening for receipt of the empty sleeve component and by providing guides within the drive for positioning the empty sleeve over the optical disc. The empty sleeve cooperates with a spring loaded frame/disc lowering mechanism which lowers the optical disc to the drive spindle where it is held by a magnetic force generated by a magnetized portion of the spindle. The sleeve also cooperates with a frame/sleeve latching mechanism to facilitate withdrawal of a frame supported optical disc from the sleeve and reinsertion of the frame supported optical disc back into the sleeve. A plurality of spring loaded members support the frame member before the sleeve actuates the lowering mechanism and free the optical disc from the spindle upon withdrawal of the sleeve from its locking/storage position.

9 Claims, 15 Drawing Figures

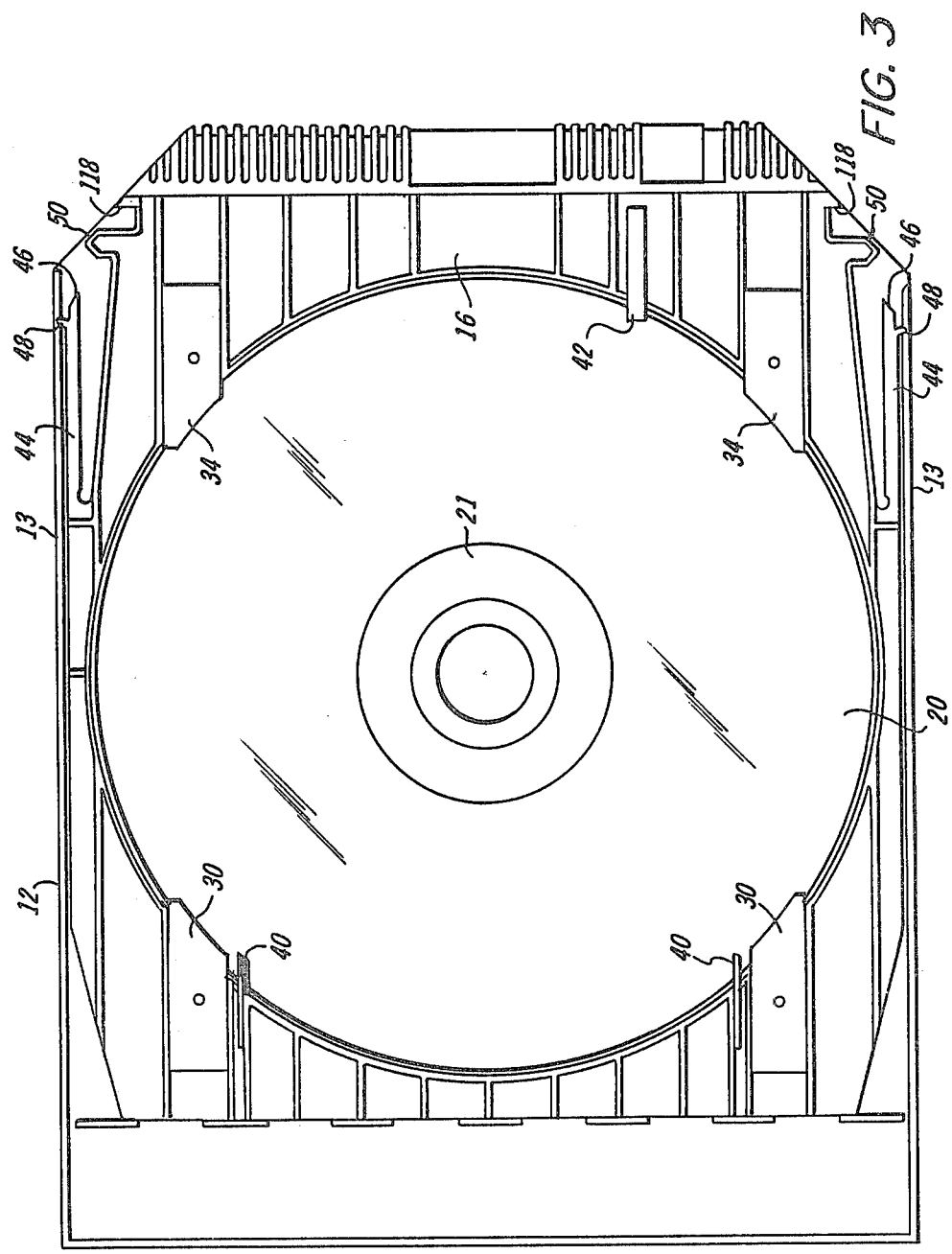

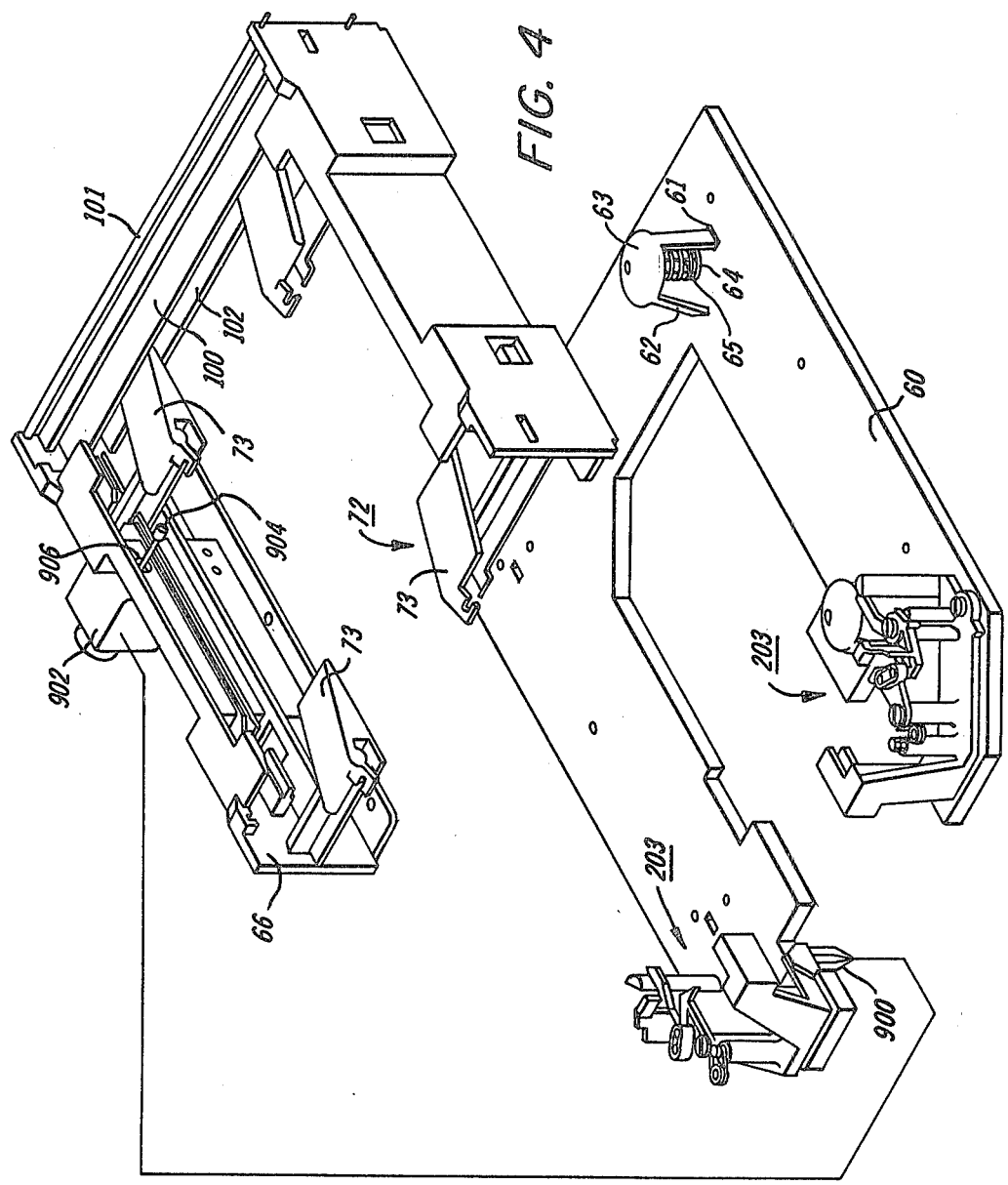

MEMORY DISC DRIVE

BACKGROUND OF THE INVENTION

Currently available, low data density optical discs are not protected by a cartridge assembly during storage, loading and unloading; and, as a result, the optical disc surface can be exposed during storage to atmospheric contaminants, such as dust, and during loading and unloading to contact with system operators. Capacitive storage discs are provided protection during storage, loading and unloading by a cartridge assembly including a sleeve into which a framed optical disc is inserted and latched. Upon insertion of the cartridge into its drive, the frame automatically unlatches from the sleeve, such that the framed optical disc remained in the drive upon removal of the sleeve. Since the unfilled sleeve remained in a relatively dirty office environment when its associated disc is in the drive, the sleeve could become contaminated during such time and such contamination could be transferred to the disc upon its reinsertion into the sleeve. Also, no convenient storage was provided for an unfilled sleeve, and, especially when several drives were being used, unfilled sleeves could clutter the office. Accordingly, there is a need for an optical disc cartridge/optical disc drive system that would protect the optical disc and place any sleeve used for such protection in a clean environment when its associated optical disc is in the drive.

Currently available disc storage drive systems are either top loading or front loading. With the former type of loading, the clamping mechanism for the disc is usually a threaded arrangement which can be mechanically complex. Current front loading systems often have the disc traverse supports which may lead to damage of the disc. Accordingly, there is a need for a disc loading arrangement which is non-damaging and mechanically simplified. It would be particularly advantageous if the sleeve storage concern and the disc loading concern could be solved concurrently by one optical disc drive system.

SUMMARY OF THE INVENTION

There is disclosed an optic disc drive system in which the empty sleeve component of an optical disc cartridge is utilized to lock the optical disc in its operational position while occupying a storage location within the drive system. The locking/storage feature is achieved by providing adjacent to the conventional disc insertion opening in the drive frame an additional opening for receipt of the empty sleeve component and by providing guides within the drive for positioning the empty sleeve over the optical disc. The empty sleeve cooperates with a spring loaded frame/disc lowering mechanism which lowers the optical disc to the drive spindle where it is held by a magnetic force generated by a magnitized portion of the spindle. The sleeve also cooperates with a frame/sleeve latching mechanism to facilitate withdrawal of a frame supported optical disc from the sleeve and reinsertion of the frame supported optical disc back into the sleeve. A plurality of spring loaded members support the frame member before the sleeve actuates the lowering mechanism and free the optical disc from the spindle upon withdrawal of the sleeve from its locking/storage position.

BRIEF DESCRIPTION OF THE DRAWINGS

FIG. 3 is a sectional view of the assembled cartridge of FIG. 2 taken along plane 3—3.

FIG. 4 is an exploded perspective view of the interior of the drive system of FIG. 1.

DETAILED DESCRIPTION OF THE INVENTION

Figure 1:
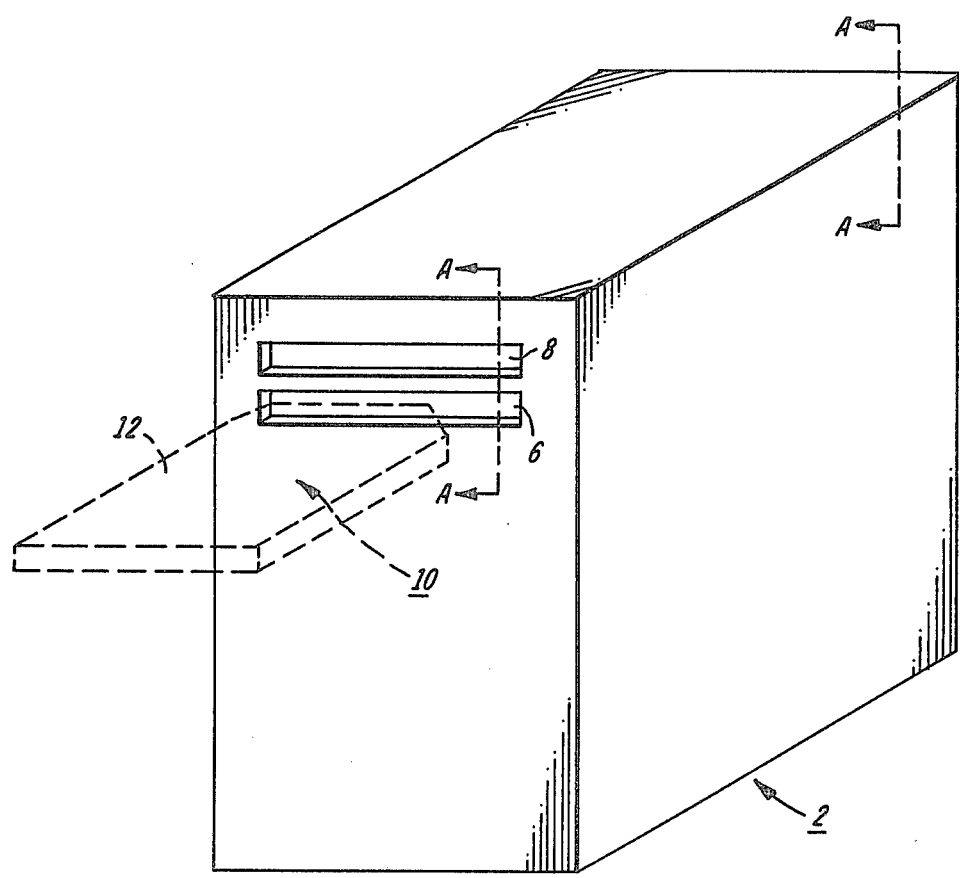
FIG. 1 is a perspective external view of an optical disc drive system.
Figure 2:
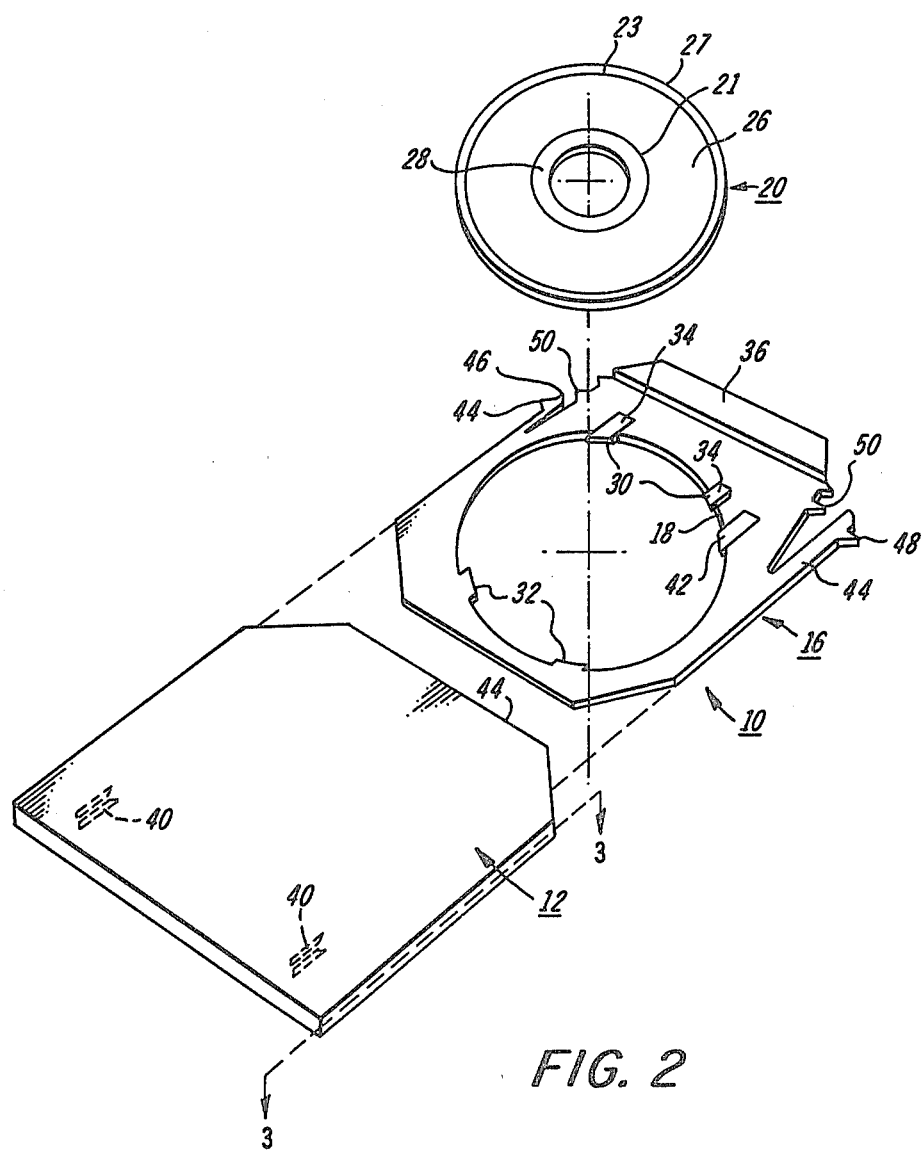
FIG. 2 is a perspective view of a novel optical disc cartridge.

Referring initially to FIG. 1, there is shown in perspective view the exterior of an optical disk drive system 2. The front panel 4 of drive system 2 has therein first and second, closely spaced, tandemly disposed slotted openings 6 and 8, respectively. Each of the openings 6 and 8 is sized in height and width to accept close tolerance insertion of the sleeve component 12 of an optical disk cartridge 10 (shown in phantom in FIG. 1). Referring to FIG. 2, the optical disk cartridge 10 would include the rigid, hollowed sleeve component 12 having an open end 14, a substantially rigid frame member 16 having a central, circular opening 18, and a rigid optical disk 20 of a diameter slightly less than the diameter of opening 18 in frame member 16.

Disk 20 includes an annular plastic substrate 26 having an outer circular edge 27 and an inner circular opening 28. Embedded within the inner portion of substrate 26 and encircling the opening 28 is an annulas of metallic material 21, such as, for example, carbon steel. A conventional optical data storage material of, for example, tellurium, is coated over a planar surface of the substrate 26 from proximate its opening 28 to proximate its outer edge 27 whereby a ring 23 free of storage material is provided at the extreme outer edge of the substrate 26. The cartridge is symmetrical and may be used with a substrate 26 that is coated with storage material on one or both sides.

Referring now to FIGS. 2 and 3, in the process of becoming operational, disk 20 is first loosely fitted between two pairs of frame tabs 32 that extend slightly into opening 18 along the top and bottom planar surfaces of frame 16 and then seated on a pair of frame tabs 30 that extend slightly into opening 18 along the bottom planar surface of frame 16. Once so placed and seated, the disk 20 is trapped in opening 18 by a pair of snap-in tabs 34 secured adjacent tabs 30 along the top planar surface of frame 16. After the optical disk is trapped, the frame/disk assembly is inserted into the cavity of the sleeve 12 via opening 14. The cavity of sleeve 12 is sized to provide a fairly tight fit between the sleeve 12 and the frame/disk assembly, and the frame is provided with a shoulder 36 to limit the extent of movement of the frame/disk assembly into the cavity of sleeve 14. Two pairs of adjacently disposed tabs 40 project from the interior major surfaces of sleeve 12 into the cavity of sleeve 12 near its closed end. Those tabs 40, which have a vertical spacing equal to the thickness of disk 20, act in conjunction with a pair of similarly separated tabs provided by one snap-in clip 42 located near the shoulder end of the frame 16 to grab disc 20 along ring 23 thereof whereby the disc 20 is lifted free of tabs 30–32 when the frame/disk is inserted into the sleeve 12 such that the disk is out of contact with tabs 30–32 when the cartridge is in storage.

Figure 13:
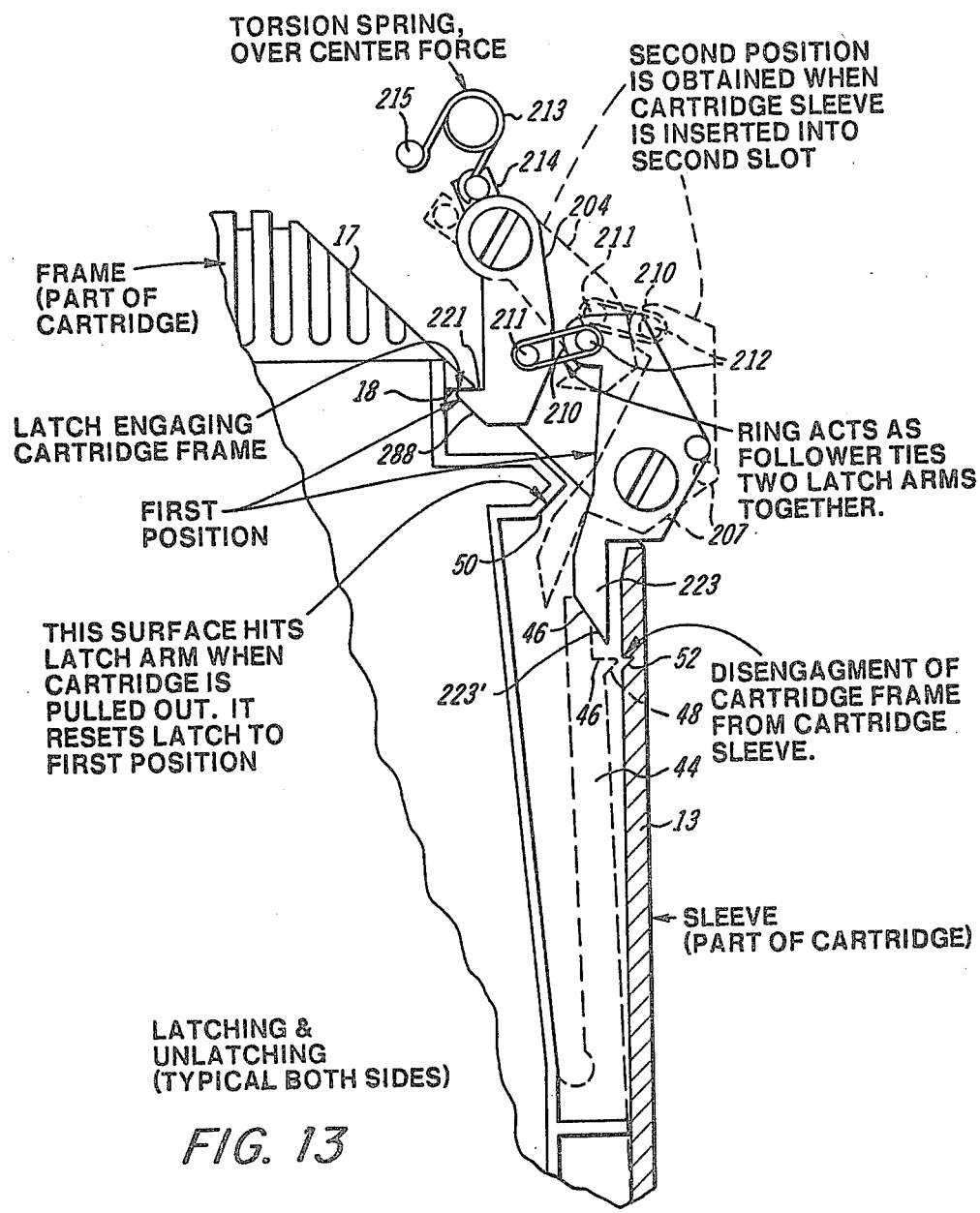
FIG. 13 is a plane view of a portion of the cartridge of FIGS. 2 and 3 in operational cooperation with the interlock shown in FIG. 4b.

As clearly shown in FIGS. 2,3 and 13, portions of the frame 16 are cut out to provide a pair of arms 44 which are flexible in a direction transverse to their length. Each arm 44 has a ramped portion 46 at its extremity and a nib portion 48 that faces outwardly and slightly beyond a major edge of frame 16. Frame 16 also has a pair of protrusions 50, one at the open end of each of the cut-out portions. As shown in FIGS. 3 and 13, recesses 52 are provided in the side walls 13 of sleeve 12 at locations adjacent to the positions of nibs 48 when the frame 16 is at the maximum insertion position within sleeve 12. Accordingly, when the frame/disk assembly is fully inserted into sleeve 12, the nibs 48 and the recesses 52 mate to immoveably lock the frame/disk assembly to the sleeve 12.

Figure 4A:
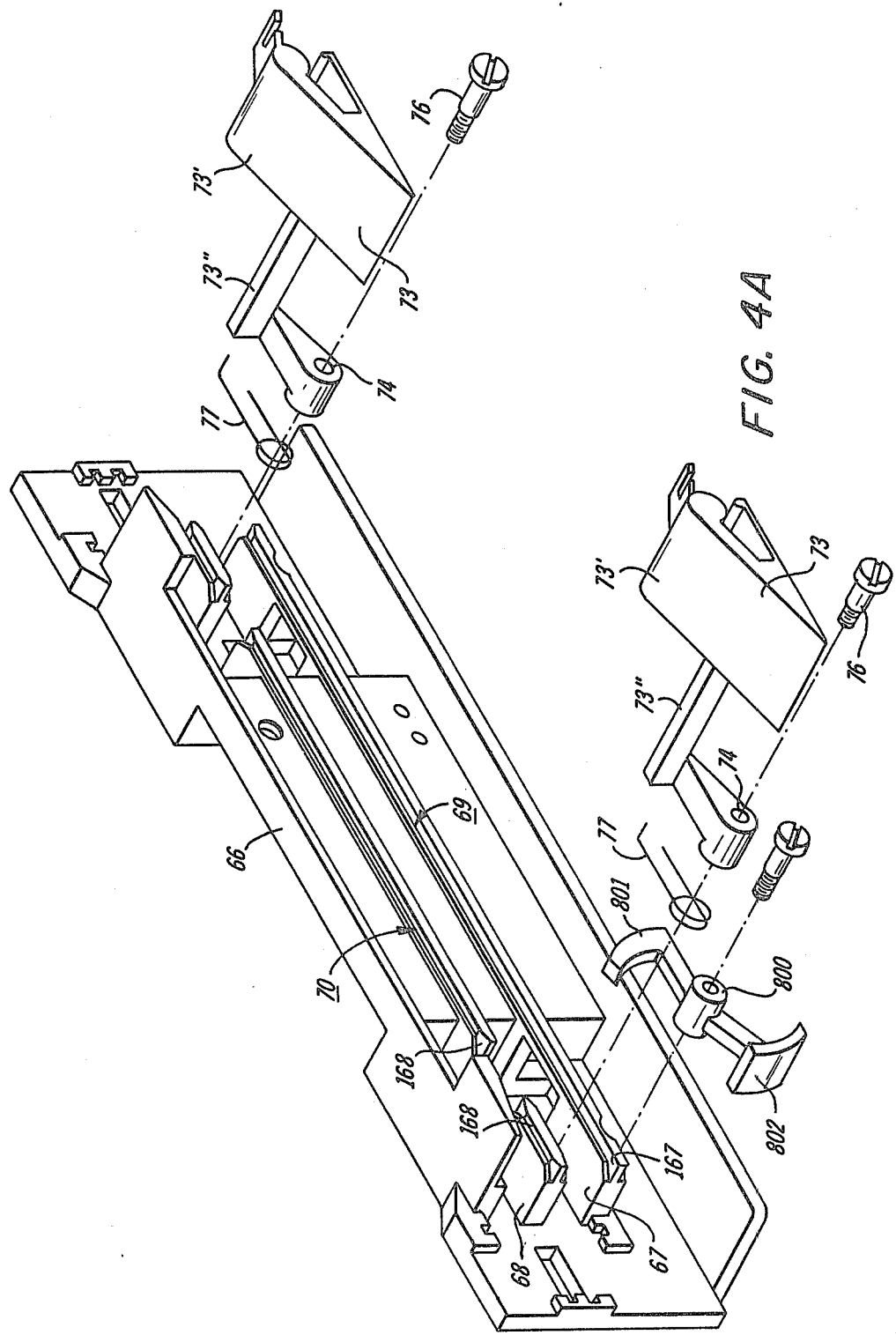
FIG. 4a is an exploded perspective view of a portion of the drive system shown in FIG. 4.

Focusing attention now on the interior of system 2 as depicted in FIGS. 4 and 4a, a flat, U-shaped plate or functionally equivalent mounting surface 60 extends rearward from front panel 4. Plate 60, with its closed end adjacent panel 4, is supported from below in a conventional manner (not shown). Plate 60 has multiple trios of slots 61 which receive the legs 62 of a plurality of disk supports 63 (only two shown). A spring 64, surrounding a post 65 secured to the plate 60, is contained within each support 63. Springs 64 apply an upward force on supports 63, with the curve extremeties of legs 62 providing a stop. Therefore, each support 63 can float along the axis of its associated spring/post.

Plate 60 also supports rigid vertically disposed side plates 65 and 66 each including a pair of horizontal ledges 67 and 68, as shown in FIGS. 4 and 4a. Ledges 67 and 68 have slots 167 and 168, respectively, which define first and second guiding mechanisms 69, 70, respectively. The slotted opening 6 lies substantially within the plane of the slots 167, and the slotted opening 8 lies substantially within the plane of the slots 168, whereby the guiding mechanisms 69, 70 guide the movement of sleeve 12 when it is inserted into the drive as described hereinafter.

Two frame/disk lowering mechanisms 71 and 72 are supported by side plates 65 and 66 as shown in FIGS. 4 and 4a. Each lowering mechanism is comprised of a pair of members 73 each having a wedge shaped section 73' and an arm section 73'' with a rotation axis provided along a hole 74 in the arm section. Holes 74 receive shoulder screws 76 for fastening members 73 to the side walls. Springs 77, each held in part by its associated screw 76, provide an upward force to each member 73 whereby the sections 73' of members 73 are normally above the plane of slots 168. Also supported by side wall 66 is a front door interlock member 800 having arm sections 801 and 802.

As shown clearly in FIG. 4, the slots 6 and 8 are actually defined by an elongated member 100 that fits between front panel members 101 and 102.

Figure 4B:
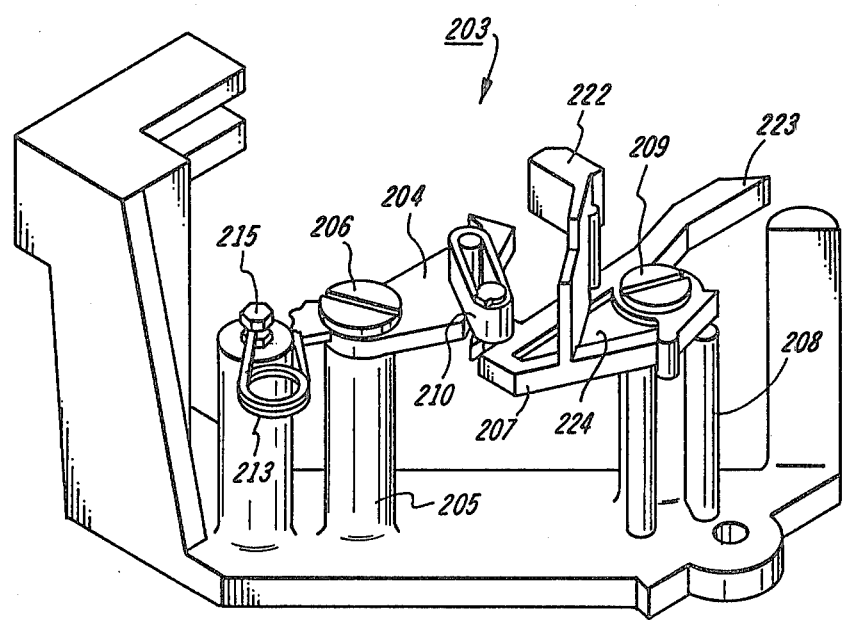
FIG. 4b is a perspective view of an interlock used in the drive system of FIG. 1.
Figure 5:
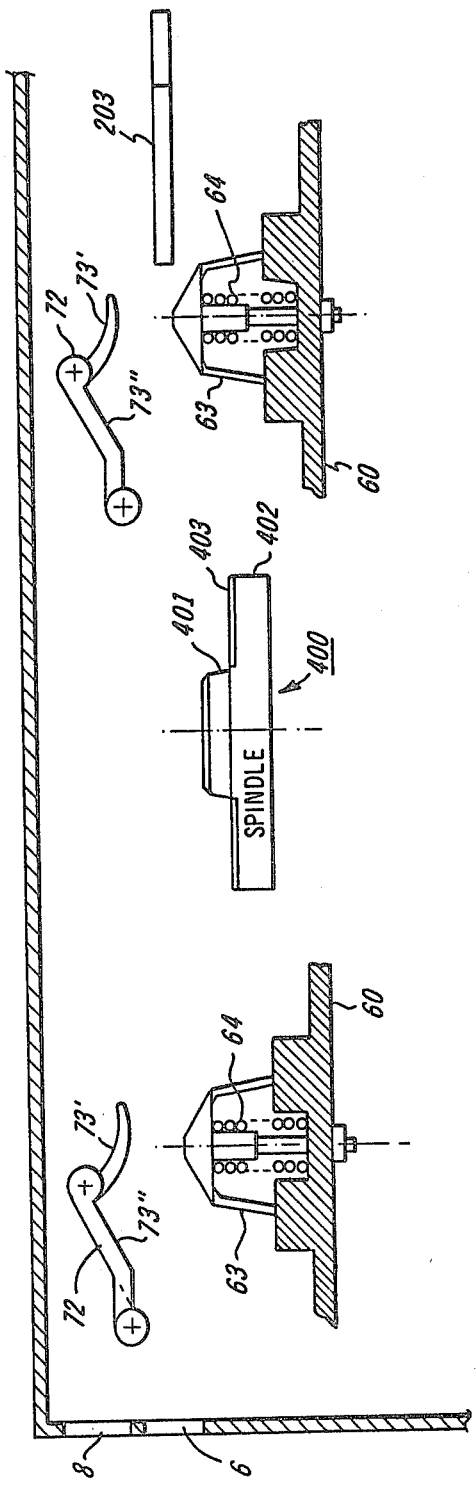
FIGS. 5 through 12 show sectional views of the drive system of FIG. 1 taken along the plane a—a for various operational conditions of the drive system.

Pair of holes 201 and 202 adjacent the open end of U-shape plate 60 receive pairs of fasteners that fasten frame latch mechanisms 203 to plate 60. As shown by FIGS. 4, 4b and 13, each latch mechanism 203 includes a first latch member 204 rotatably supported on a post 205 by a shoulder screw 206, a second latch member 207 rotatably supported on a post 208 by a shoulder screw 209, and a belt or ring fastener 210 bridging a post 211 of member 204 and a post 212 of member 207. Fasteners 210 act as follower mechanisms to latch members 204 and 207 together. A torsion spring 213 is coupled between a tab 214 of each member 204 and a post 215. Members 204 are substantially flat and horizontally disposed, having hooking sections 221. Each member 207 has a vertically disposed arm 222 and a horizontally disposed section 224 including an arm 223. Members 204 and the sections 224 of members 207 lie substantially in the plane of opening 6 and slots 167, and the upper portions of arms 222 lie substantially in the plane of opening 8 and slots 168.

Referring to FIGS. 5 through 12, a drive spindle 400, supported from below in a conventional manner (not shown), extends upward through the opening in U-shape plate 60. Spindle 400 includes a raised conical frustrum section 401, having a diameter substantially mated to the diameter of the opening 28 of disk 20, and a supporting section 402. A magnet 403 forms an integral part of the upper surface of support section 402. When the drive is in operation, spindle 400 is rotated at a constant speed by conventional drive means (not shown).

Focusing attention now on the operation of the drive system 2, prior to insertion of a cartridge 10 (including sleeve, frame and disk) into the drive, the members 204 and 207 of the latch mechanism 203 have been forced into the solid line position shown in FIG. 13. The solid line position is maintained prior to cartridge insertion since the torsion spring will not allow repositioning until an over-center force or displacement is applied to interlock mechanisms 73.

Figure 6:
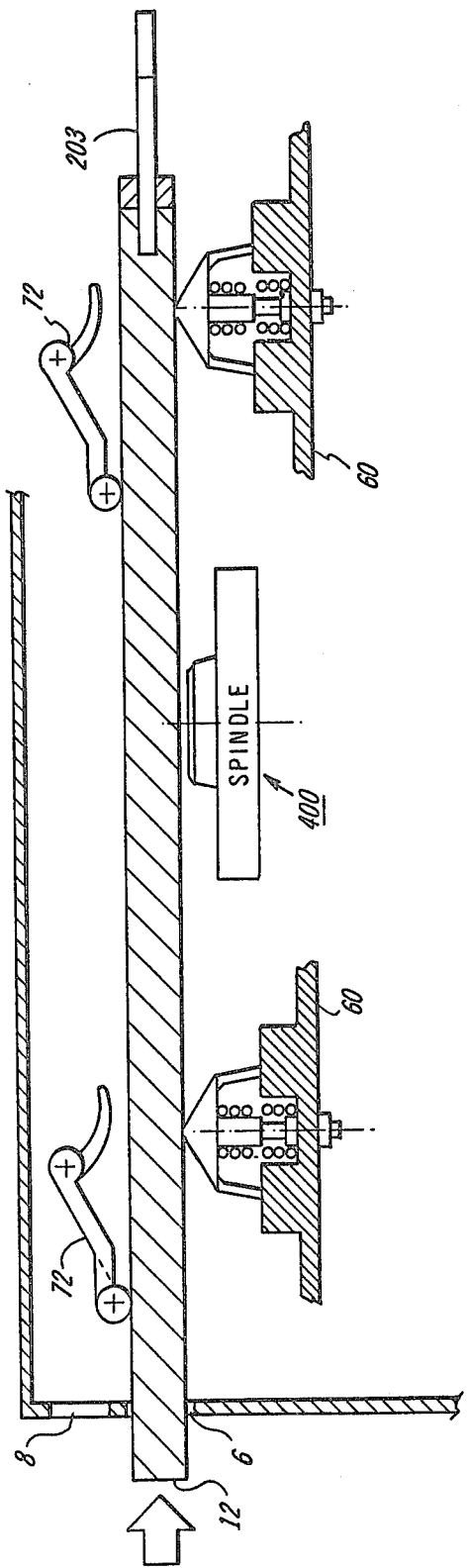
Figure 7:
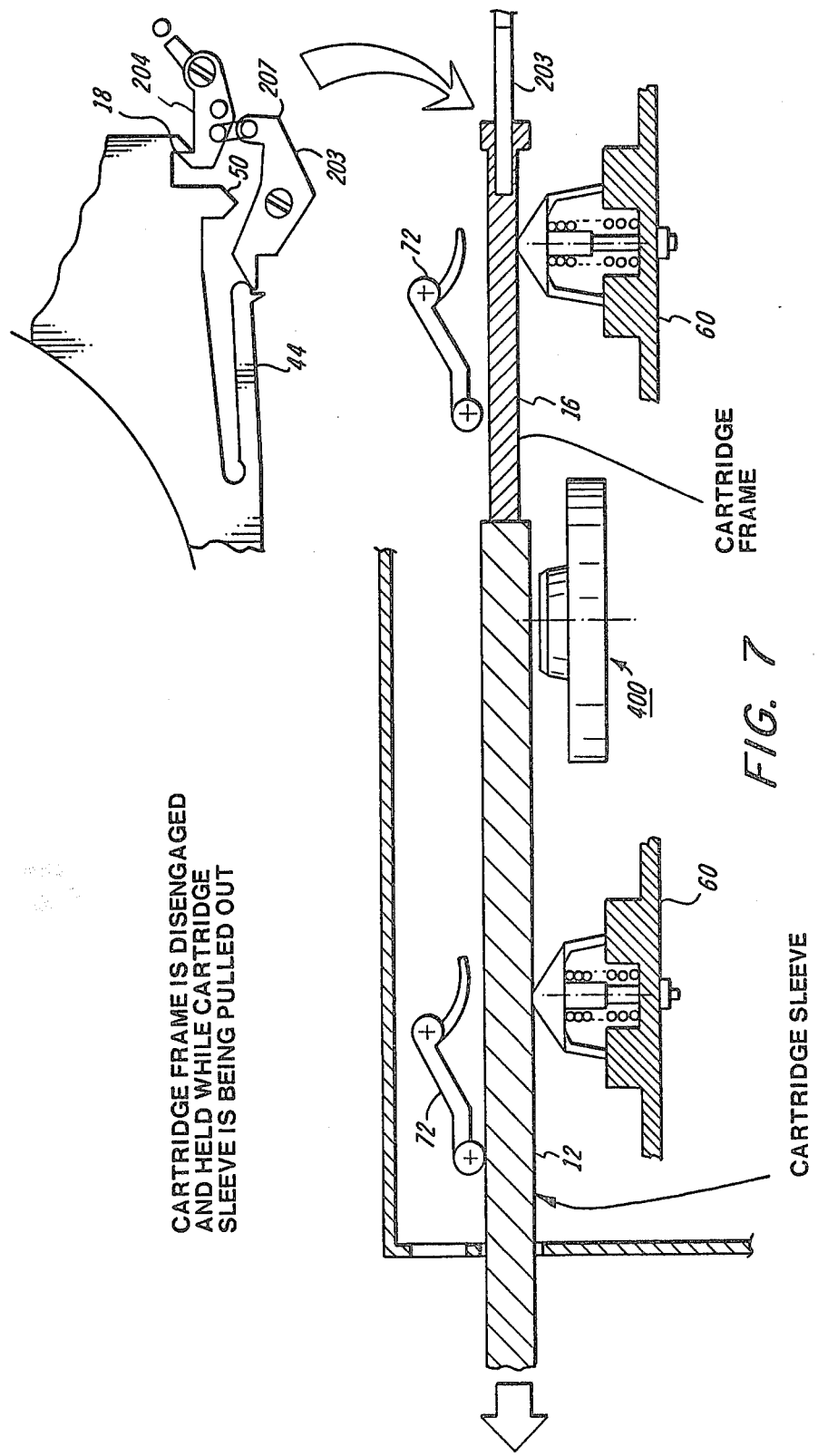
Figure 8:
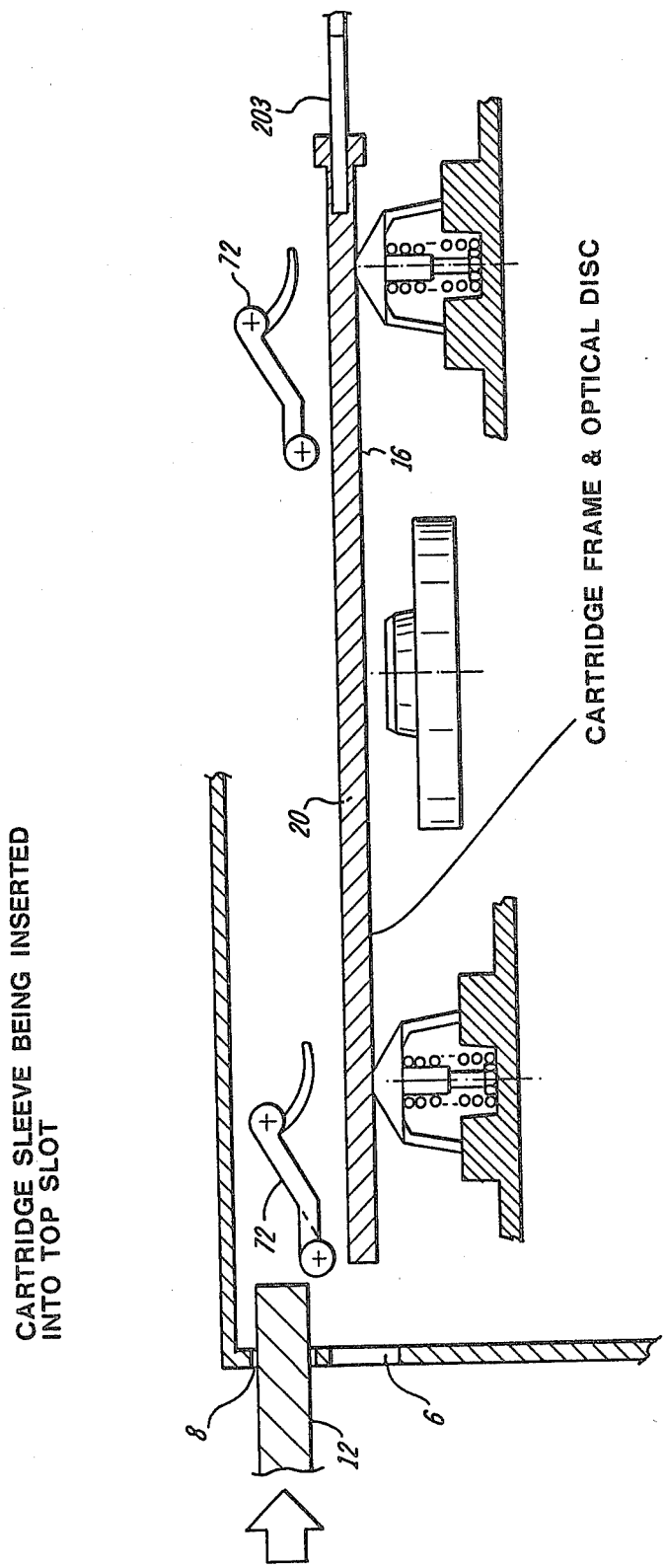
Figure 9:
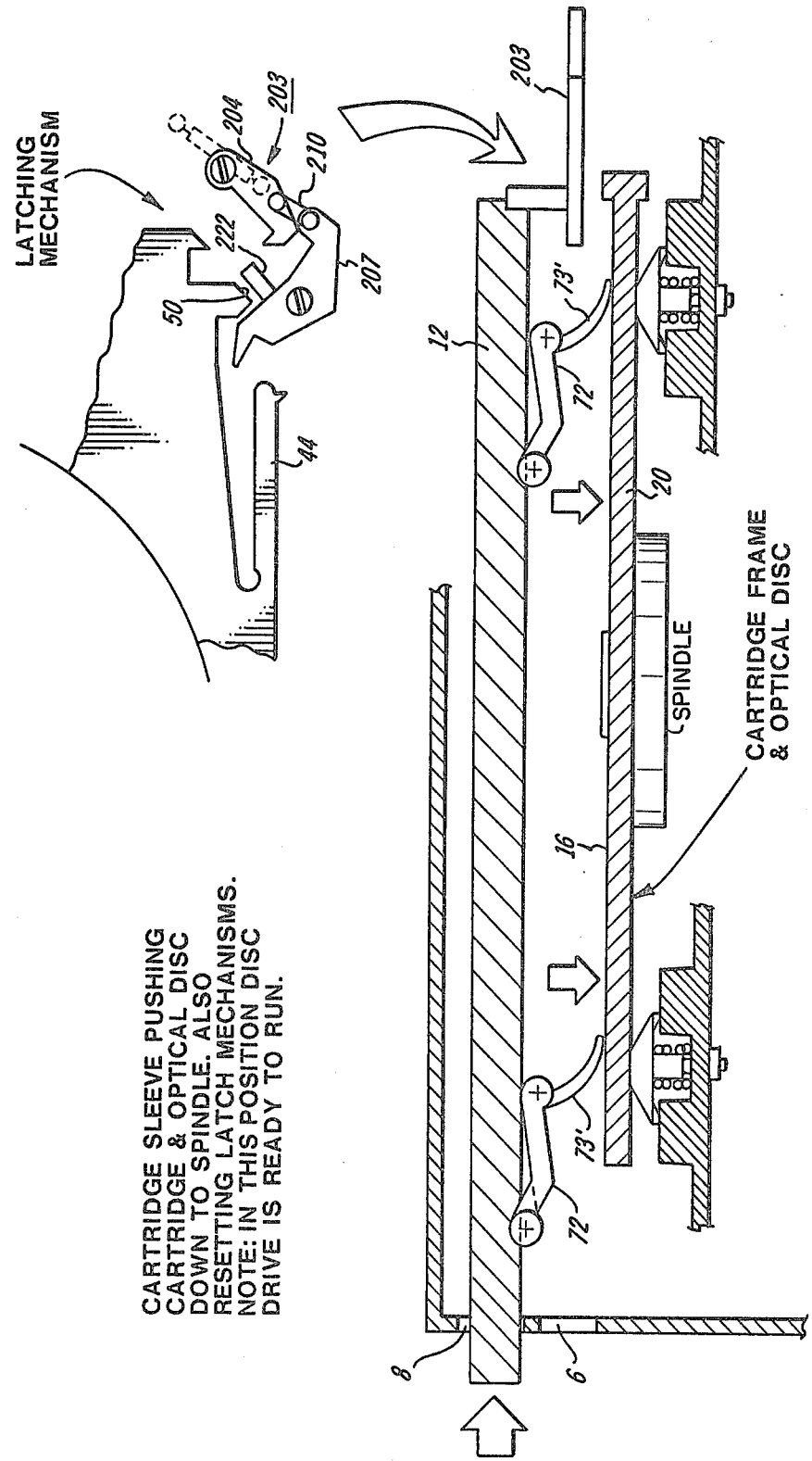
Figure 10:
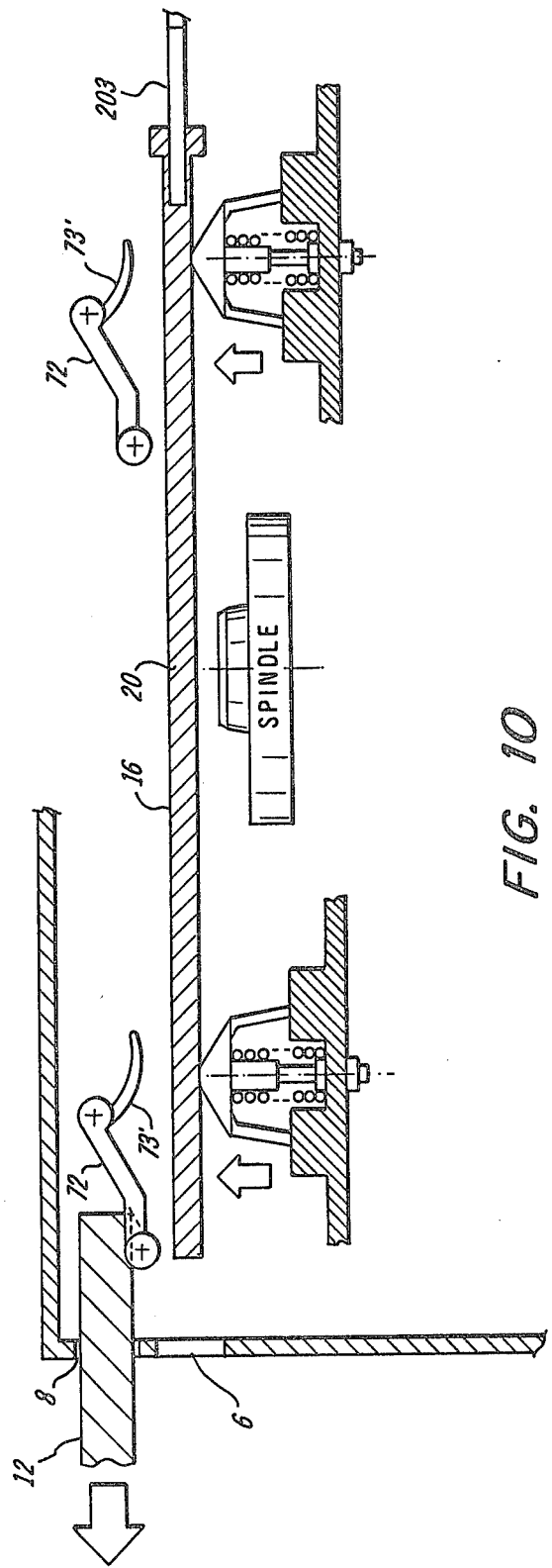
Figure 11:
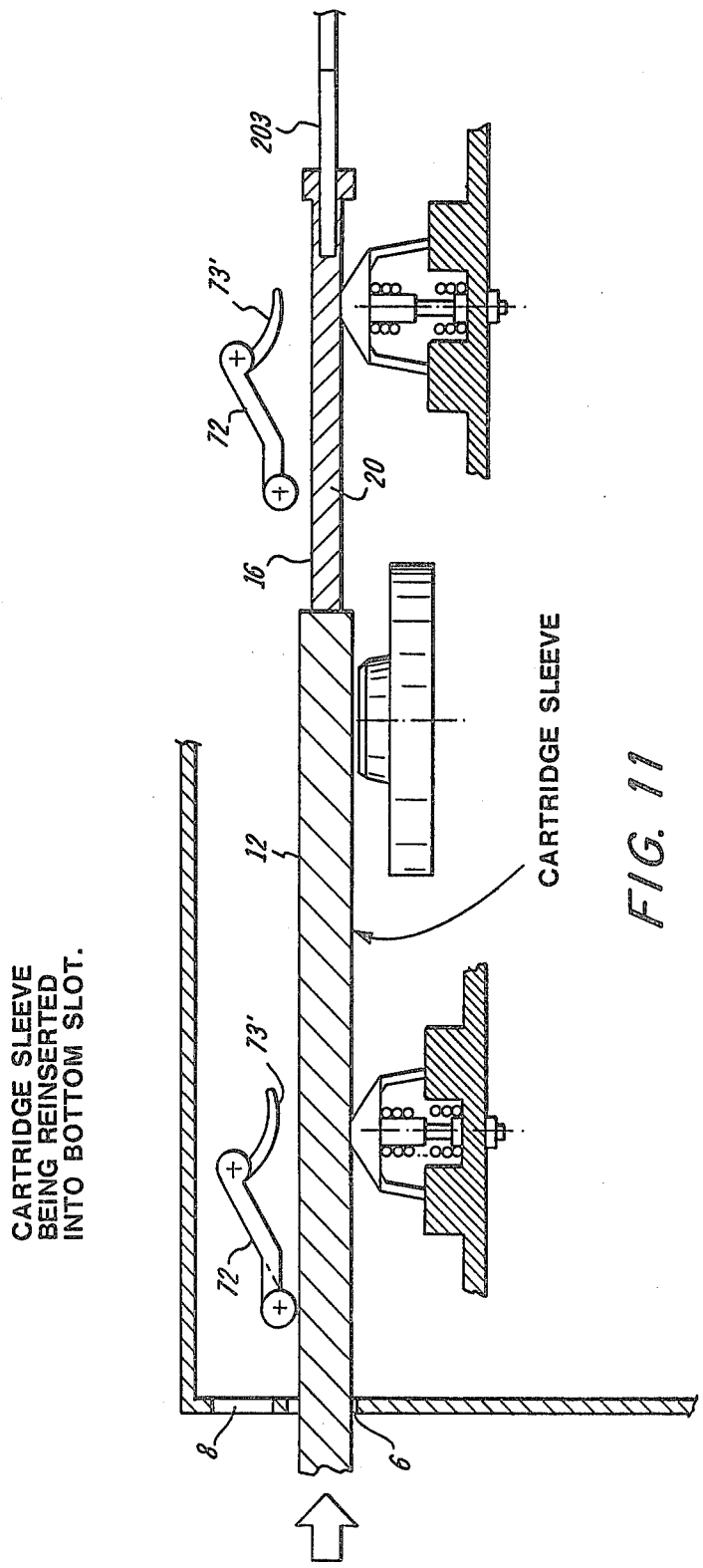
Figure 12:
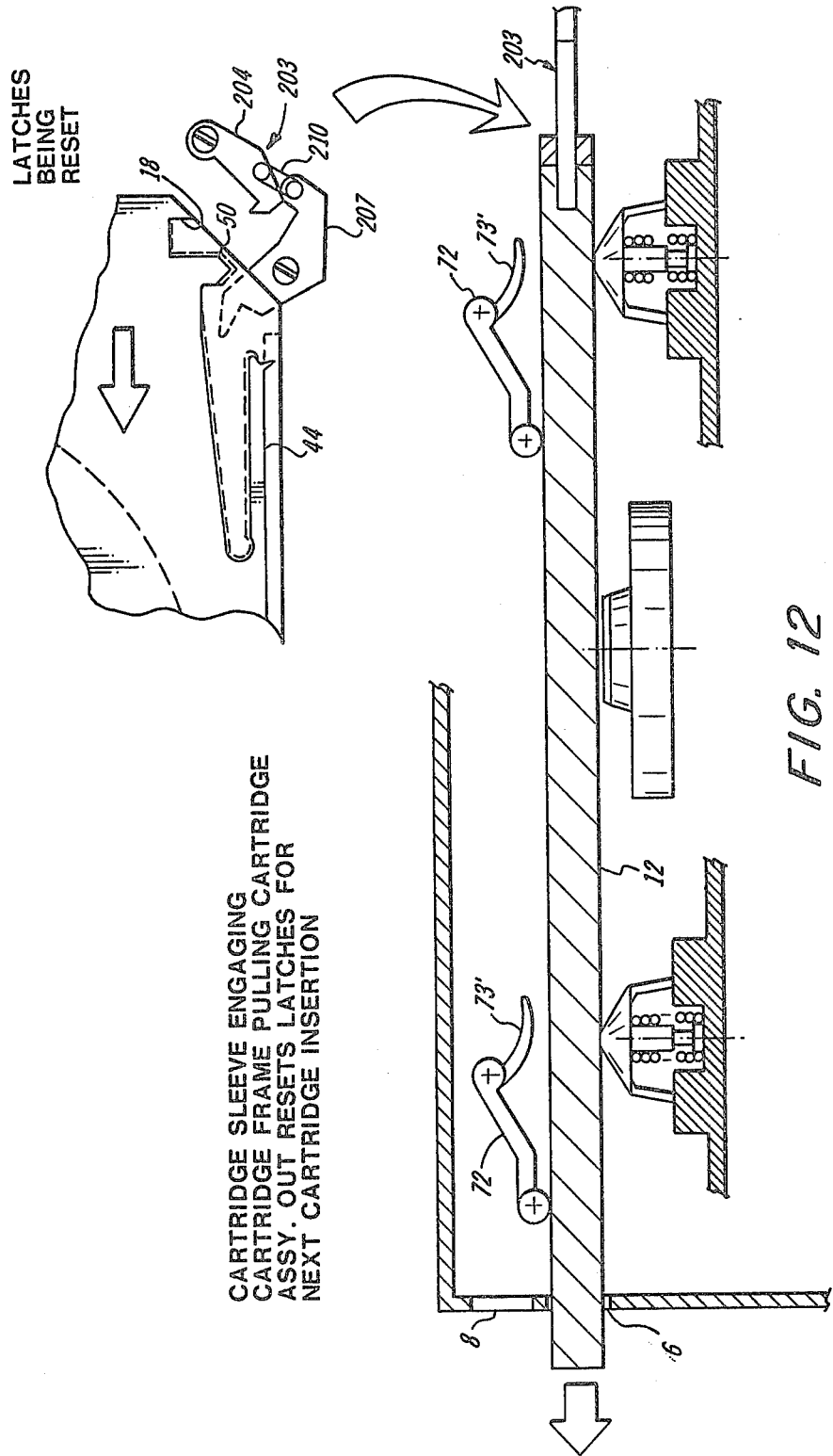

To initiate loading of disk 20, the cartridge 10 is inserted into the lower slotted opening 6 and once inside the drive is guided to the rear by guiding mechanisms 69 (FIG. 6). Just prior to full insertion of the cartridge within the drive 2, the ramped edge 46 of each of the legs 44 contacts the ramped edge 223' of each of the legs 223 of the latches and, due to that contact and the orientation of the ramped edges 46 and 223', further insertion of the cartridge causes the legs 44 to bend or rotate inwardly. That rotation results in nibs 48 disengaging recesses 52, thus freeing the frame/disk from the sleeve. There is also contact between the sloping edges 17 of the frame 16 and the ramped edges 288 of latch members 204, causing latch members 204 to rotate slightly outward. That rotation is not of sufficient magnitude to generate a sufficient over-center force to reposition the members 204 and 207 of the latches. When the sloping edges 17 of the frame have passed the ramped edges 288 of the latch members 204, the latch members 204 are free to rotate inwardly to their original position with the surfaces 18 of the frame now jutaposed against surfaces 221 of the latch members. Thus, the latches 203 have latched onto the frame 16 now disengaged from the sleeve 12 and the frame latched to the interlock members 204, withdrawal of the sleeve 12 from the drive (FIG. 7) will leave the frame/disk within the drive. With the withdrawal of the cartridge 10, the frame is supported by spring loaded supports 63. Chamfered holes in the frame (not shown) mate with pins (not shown) extending from the plate 60 to ensure accurate positioning of the frame/disk relative to the drive spindle 400.

The sleeve 12 is inserted now into the second slotted opening 8 (FIGS. 8 and 9) and once inside the drive is guided rearward by guiding mechanism 70. During such movement, the sleeve contacts first the upper ramped surfaces 73' of the wedge shaped sections 73 of lowering mechanism 71 and then contacts the upper ramped surfaces 73' of the wedged shaped sections 73 of lowering mechanism 72, such contact causing the lowering mechanisms 71 and 72 to move downward and into contact with frame 16, whereby the frame/disk is forced downward. Just before the point of extreme downward movement of the frame is achieved, the disk 20 is seated on the spindle 400. Since the spacing between the tabs 30 and 32 is slightly greater than the thickness of the disk 20, the disk is freed from the frame 16 when the disk is seated on the spindle 400. Once in contact with the spindle, the disk is held to the spindle by the magnetic field between the magnet 403 and the metallic annulus 21 of the disk. The disk is now ready for read/write operation in conjunction with a light source (not shown) that emits a pulsed beam for writing and a continuous wave beam for reading. A carriage (not shown) transports the light source radially across the disc.

In addition to seating the disk on the spindle 400, full insertion of the sleeve into the second slotted opening also causes contact between the vertically disposed arms 222 of latch members 207 and the angled edges 17 of the sleeve, resulting in a displacement of members 207 by a distance great enough to provide an over-centering force on the latches, whereby members 207 move into their second stable position (shown dotted in FIG. 13). Due to the action of fasteners 210, members 204 also move up to their second stable position (also shown dotted in FIG. 13) when members 207 so move. As shown in FIG. 13, in the second stable position members 204 are free of edges 18 of the frame 16, and the legs 223 of members 207 are in the path of the protrusions 50 of the frame 16.

When utilization of the disk 20 is completed, the sleeve 12 is withdrawn from the second slotted opening 8 (FIG. 10), such withdrawal removing the downward forces on the lowering mechanisms 71 and 72 and, in turn, the downward forces on the frame 16. Removal of such downward forces leaves the spring loaded supports 63 exerting upward forces on the frame 16 and those forces are sufficient to overcome the magnetic force between the spindle magnet 403 and the disk annulus 21 such that the frame and disk move upwardly from the spindle, with the supports 63 now supporting the frame 16.

Insertion of the empty sleeve 12 into the first slotted opening (FIG. 11) once again places the frame/disk within the sleeve. Since the latch members 204 and 207 are in their second stable position, nibs 48 are free to engage recesses 52 whereby the sleeve is again engaged to, or locked to, the frame. Subsequent withdrawal of the sleeve/frame/disc (FIG. 12) causes the protrusions 50 to strike legs 222 of members 207, causing a displacement of members 207 great enough to provide an over-center force to the latch mechanisms 203 to once again set the members of the latch mechanisms 203 in the first stable position such that the drive is ready for insertion of a new cartridge.

In addition to operational safety features inherent in the foregoing description, other operational safety features are provided. Insertion of the sleeve into the second slotted opening 8 results in the sleeve contacting arm section 801 of latch member 800, causing the latch member to rotate with the result that arm section 802 moves into a position that prevents another cartridge from being inserted into the bottom slot 6 and also prevents access to the interior of the drive via slot 6 while the laser is in operation. Also, a sensing mechanism 900 is associated with one of the interlock mechanisms 203 whereby a control signal is generated when the members of that interlock mechanism are forced into their second stable position. That signal energizes an electromagnet 902, causing a pin 904 to be driven through a hole 906 in the side wall 66 and into contact with the frame 16 whereby the frame 16 cannot be removed from the drive until after the pin is withdrawn upon the latch members reverting to their first stable position.

I claim:

1. A drive utilized in conjunction with a framed memory disc member contained within a sleeve when said member is not operable in said drive, comprising:
   a housing having a front section, said front section having first and second slotted openings therein, each of said openings being sufficiently wide to accept said sleeve;
   a driveable spindle member;
   first means for providing the removal of said framed member from its sleeve when such sleeve containing the framed member is inserted into said first slotted opening and into operative association with said first means and then withdrawn from said first slotted opening; and
   second means for clamping said framed member in an operable position relative to said spindle member when said sleeve is inserted into said second slotted opening and into operative association with said second means.

2. A drive utilized in conjunction with a framed memory disc, contained within and engaged to a sleeve during non-use, comprising:
   a housing having a front section, said front section having first and second slotted openings in a tiered arrangement, each of said openings being sufficiently wide to accept said sleeve;
   a driveable spindle member;
   first means for disengaging said framed memory disc from said sleeve and engaging said framed memory disc when said sleeve containing said framed memory disc is inserted into said first slotted opening and into operative association with said first means, whereby said framed memory disc remains in said housing when said sleeve is withdrawn from said first slotted opening; and
   second means for clamping said framed memory disc into an operable position relative to said spindle when said sleeve is inserted into said second slotted opening and into operative association with said second means.

3. A drive utilized in conjunction with a framed optical memory disc, contained within and engaged to a sleeve during non-use, comprising:
   a housing having a front section, said front section having first and second slotted openings in a tiered arrangement, each of said openings being sufficiently wide to accept said sleeve;
   a driveable spindle member;
   first means providing for the disengagement between said sleeve and said framed disc and the emptying of said sleeve and the reengagement between said sleeve and said framed disc upon the sequential actions of placing the sleeve containing the framed disc into said first slotted opening and into operative association with said first means, withdrawing said sleeve from said first slotted opening to empty said sleeve, placing the empty sleeve into said second slotted opening, and placing the empty sleeve into said first slotted opening; and second means for clamping said framed disc in an operable position relative to said spindle when said sleeve is inserted into said second slotted opening and into operative association with said second means.

4. A drive utilized in conjunction with a framed optical memory, contained within and engaged to a sleeve during non-use, comprising:

a housing having a front section, said front section having first and second slotted openings in a tiered arrangement, each of said openings being sufficiently wide to accept a sleeve;

a driveable spindle member;

first means both for disengaging said framed optical memory from said sleeve when a sleeve containing a framed optical memory is inserted into said first slotted opening and into operative association with said first means whereby said optical memory remains within said housing when said sleeve is withdrawn from said first slotted opening, and, following disengagement of said framed optical memory with said first means by movement of at least a portion of said first means following insertion of said sleeve into said second slotted opening, for providing reengagement between said sleeve and said framed optical memory when said sleeve is reinserted into said first slotted opening, whereby said framed optical memory is engaged to said sleeve and withdrawable from said housing upon withdrawl of said sleeve from said housing; and second means for clamping said framed optical memory into an operable position relative to said spindle when said sleeve is inserted into said second slotted opening and into operative association with said second means.

5. A method of loading a frame-supported memory disc housed in a sleeve into its operative position within a drive including at least one frame/sleeve detachment member and at least one disc positioning member, comprising the steps of:

inserting the sleeve containing the frame-supported memory disc into the drive sufficiently far for engaging the frame/sleeve detachment member which detaches the frame from the sleeve;

withdrawing the sleeve from the drive; and inserting the sleeve sufficiently far into the drive once again for engaging the disc positioning member which effects positioning of the memory disc in its operative position within the drive.

6. A method of loading a frame-supported optical disc housed in a sleeve into its operative position within a drive therefor including at least one frame/sleeve detachment member and at least one disc positioning member, comprising the steps of:

inserting the sleeve containing the frame-supported optical disc sufficiently far into a first opening in the drive for engaging the frame/sleeve member which detaches the frame from the sleeve;

withdrawing the sleeve from the drive; and inserting the sleeve into a second opening in the drive for engaging the disc positioning member which effects positioning of the optical disc in its operative position within the drive.

7. A method of loading a frame-supported optical disc housed in a sleeve into and out of its operative position within a drive therefor including at least one frame/sleeve detachment member and at least one disc positioning member, comprising the steps of:

inserting the sleeve containing the frame-supported optical disc into the drive sufficiently far for engaging the frame/sleeve detachment member which detaches the frame from the sleeve;

withdrawing the sleeve from the drive;

inserting the sleeve sufficiently far into the drive for engaging the disc positioning member which effects positioning of the optical disc in its operative position within the drive; and withdrawing the sleeve from the drive.

8. A method of loading a frame-supported optical disc housed in a sleeve into and out of its operative position within a drive therefor, comprising the steps of:

inserting the sleeve containing the frame-supported optical disc into a first opening in the drive sufficiently far for engaging the frame/sleeve detachment member which detaches the frame from the sleeve;

withdrawing the sleeve from the drive;

inserting the sleeve sufficiently far into a second opening in the drive for engaging the disc positioning member which effects positioning of the optical disc in its read/write position within the drive; and upon utilization of the disc, withdrawing the sleeve from the drive.

9. A method of loading a frame-supported optical disc housed in a sleeve into and out of a drive therefor including at least one frame/sleeve detachment member and at least one disc positioning member, comprising the steps of:

inserting the sleeve containing the frame-supported optical disc into a first opening in the drive sufficiently far for engaging the frame/sleeve detachment member which detaches the frame from the sleeve;

withdrawing the sleeve from the drive;

inserting the sleeve sufficiently far into a second opening in the drive for engaging the disc positioning member which effects positioning of the optical disc in its read/write position within the drive;

withdrawing the sleeve from the drive;

inserting the sleeve into said first opening in the drive for engaging the frame to the sleeve; and withdrawing the sleeve/frame from the drive.

* * * * *